US009065642B2

(12) United States Patent
Zaverucha et al.

(10) Patent No.: US 9,065,642 B2
(45) Date of Patent: Jun. 23, 2015

(54) INTERCEPTING KEY SESSIONS

(75) Inventors: Gregory Marc Zaverucha, Redmond, WA (US); Matthew John Campagna, Ridgefield, CT (US)

(73) Assignee: Certicom Corp., Mississauga, ON (CA)

( * ) Notice: Subject to any disclaimer, the term of this patent is extended or adjusted under 35 U.S.C. 154(b) by 257 days.

(21) Appl. No.: 13/458,594

(22) Filed: Apr. 27, 2012

(65) Prior Publication Data
US 2013/0236019 A1 Sep. 12, 2013

Related U.S. Application Data

(60) Provisional application No. 61/607,681, filed on Mar. 7, 2012.

(51) Int. Cl.
H04L 29/06 (2006.01)
H04L 9/08 (2006.01)
H04L 9/32 (2006.01)
H04L 9/06 (2006.01)

(52) U.S. Cl.
CPC ............ *H04L 9/0894* (2013.01); *H04L 9/3263* (2013.01); *H04L 9/0662* (2013.01); *H04L 9/0841* (2013.01); *H04L 9/321* (2013.01); *H04L 63/306* (2013.01)

(58) Field of Classification Search
CPC ... H04L 9/3073; H04L 9/0841; H04L 9/0844; H04L 9/0847; H04L 9/0833; H04L 9/3066; H04L 9/3263; H04L 63/0823; H04W 12/04
USPC ....................................................... 380/278
See application file for complete search history.

(56) References Cited

U.S. PATENT DOCUMENTS

| 5,633,928 | A | * | 5/1997 | Lenstra et al. | 380/286 |
| 5,633,929 | A | * | 5/1997 | Kaliski, Jr. | 380/286 |
| 5,841,865 | A | | 11/1998 | Sudia | |
| 5,852,665 | A | * | 12/1998 | Gressel et al. | 380/30 |
| 6,170,744 | B1 | * | 1/2001 | Lee et al. | 235/380 |

(Continued)

FOREIGN PATENT DOCUMENTS

GB  2376392  12/2002

OTHER PUBLICATIONS

Chen, et al, 'Identity Based Authenticated Key Agreement Protocols from Pairings', Hewlett-Packard Company, 2003, entire document, http://www.hpl.hp.com/techreports/2003/HPL-2003-25.pdf.*

(Continued)

*Primary Examiner* — Luu Pham
*Assistant Examiner* — Ronald Baum
(74) *Attorney, Agent, or Firm* — Fish & Richardson P.C.

(57) ABSTRACT

In some implementations, a method for providing a session key to a third party includes identifying a private key associated with a public key certificate in response to an event. A session key for a communication session is based, at least in part, on the private key, an associated seed for a random number generator, and public keys assigned to user equipment participating in the communication session. The private key associated with the public key certificate is automatically transmitted to an interception authority. The interception authorities are configured to grant a third party access to the private key and the associated seed to in response to a request from a third party authorized to access the communication session.

14 Claims, 5 Drawing Sheets

(56) References Cited

U.S. PATENT DOCUMENTS

| | | | |
|---|---|---|---|
| 6,226,383 B1* | 5/2001 | Jablon | 380/30 |
| 7,213,266 B1* | 5/2007 | Maher et al. | 726/26 |
| 7,391,868 B2* | 6/2008 | Qu et al. | 380/277 |
| 7,594,108 B2* | 9/2009 | Vaidyanathan | 713/157 |
| 7,657,037 B2* | 2/2010 | Callas | 380/284 |
| 7,936,869 B2* | 5/2011 | Beeson | 380/30 |
| 8,074,073 B2* | 12/2011 | Gentry | 713/170 |
| 8,316,237 B1* | 11/2012 | Felsher et al. | 713/171 |
| 2006/0010086 A1* | 1/2006 | Klein | 705/410 |
| 2006/0064375 A1* | 3/2006 | Campagna et al. | 705/39 |
| 2010/0211779 A1* | 8/2010 | Sundaram | 713/168 |
| 2012/0272064 A1* | 10/2012 | Sundaram et al. | 713/171 |

OTHER PUBLICATIONS

Joye, M., et al, 'Identity-Based Cryptography', 2009, IOS Press, et al, chapter 9, http://antoanthongtin.vn/Portals/0/UploadImages/kiennt2/Sach/Sach-CSDL4/1586039474.pdf.*

Abouelseoud, Y., 'Efficient Certificateless One-Pass Key Agreement Protocols', WCECS 2014, Oct. 22-24, 2014, entire document, http://www.iaeng.org/publication/WCECS2014/WCECS2014_pp675-680.pdf.*

Office Action issued in Canadian Application No. 2,807,055 on May 14, 2014; 3 pages.

Brown et al. Provably secure implicit certificate schemes. Proceedings of Financial Cryptography and Data Security (FC'01), LNCS 2339 (2002), 156-165.

Denning, Dorothy E. et al.; "Key Escrowing Today"; IEEE Communications Magazine; vol. 32, No. 9; Sep. 1, 1994; pp. 58-68.

Hankerson et al. Guide to Elliptic Curve Cryptography, Springer-Verlag, New York, 2004.

Housley et al. RFC 2459: Internet X.509 Public Key Infrastructure Certificate and CRL Profile. IETF RFC, Jan. 1999. Available at www.ietf.org/rfc/rfc2459.txt.

Menezes et al. Handbook of Applied Cryptography, CRC Press, Boca Raton, 1997.

"Pintsov et al. Postal revenue collection in the digital age.Proceedings of Financial Cryptography and Data Security (FC'00), LNCS 1962 (2001), 105-120."

Standards for Efficient Cryptography; SEC 4: Elliptic Curve Qu-Vanstone Implicit Certificate Scheme (ECQV). Draft Document, Version 0.97, Mar. 2011. Available at secg.org.

Standards for Efficient Cryptography; SEC 1: Elliptic Curve Cryptography Version 2.0, May 2009. Available at secg.org.

Extended European Search Report issued in European Application No. 13156253.0 on Feb. 17, 2014; 7 pages.

* cited by examiner

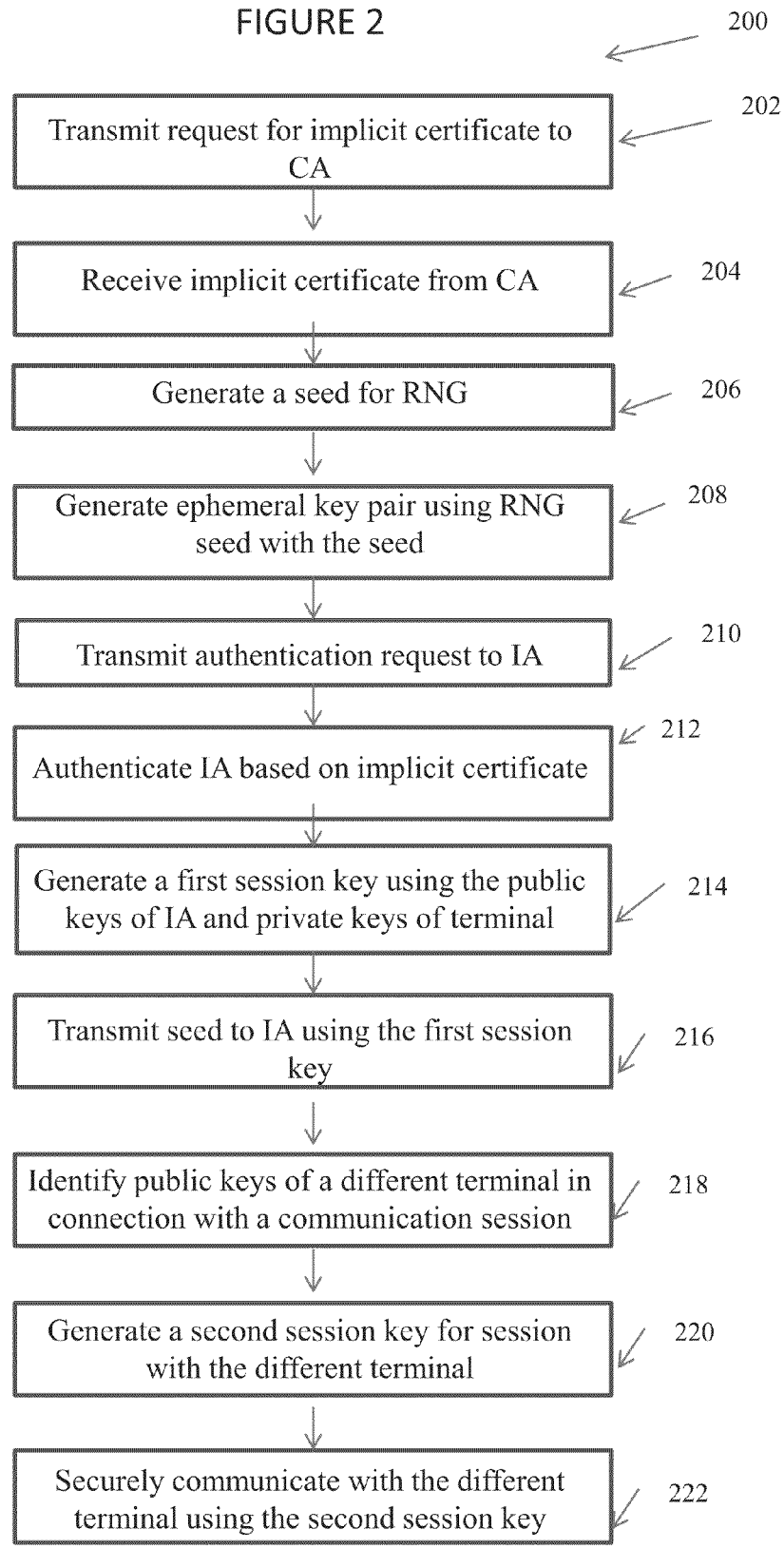

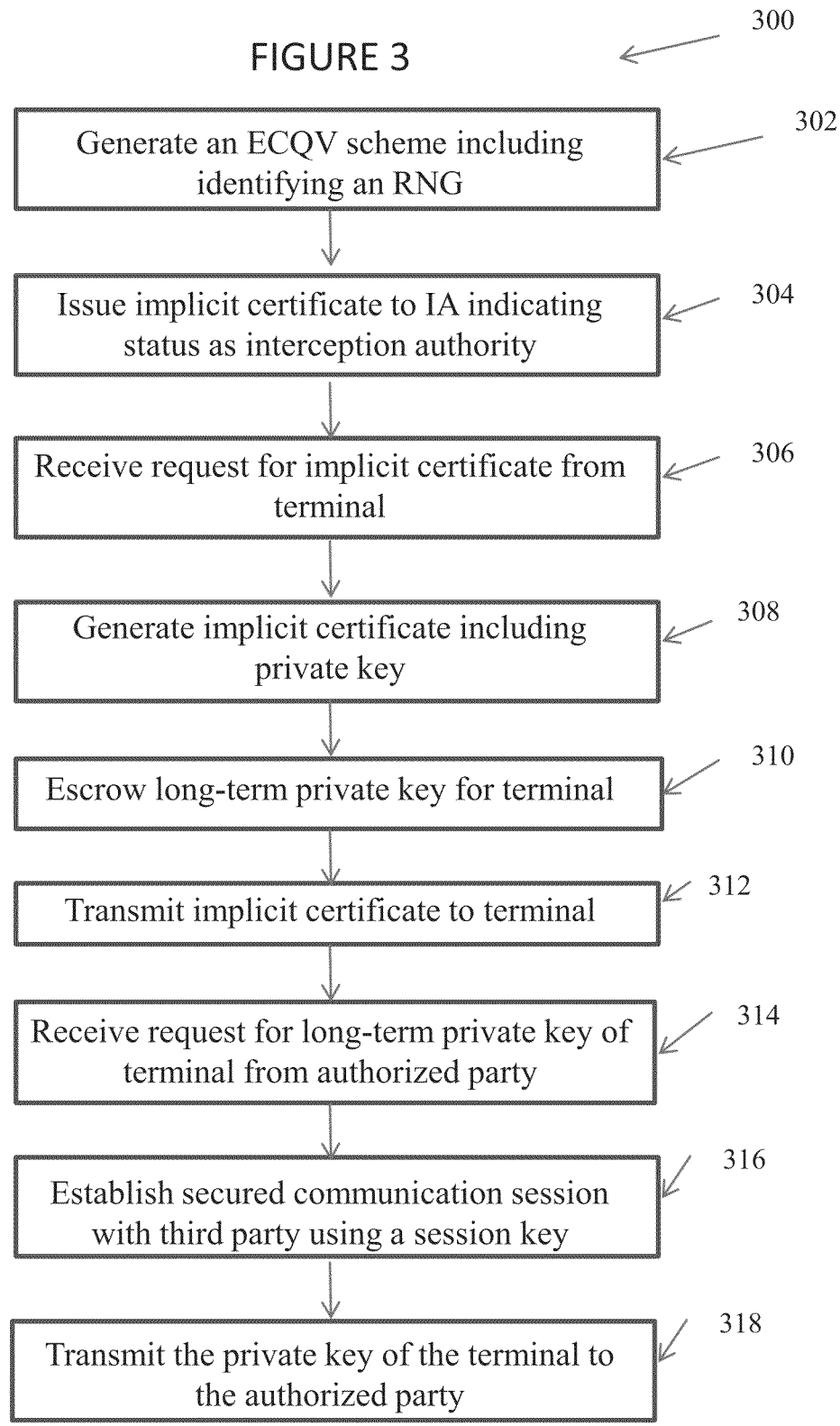

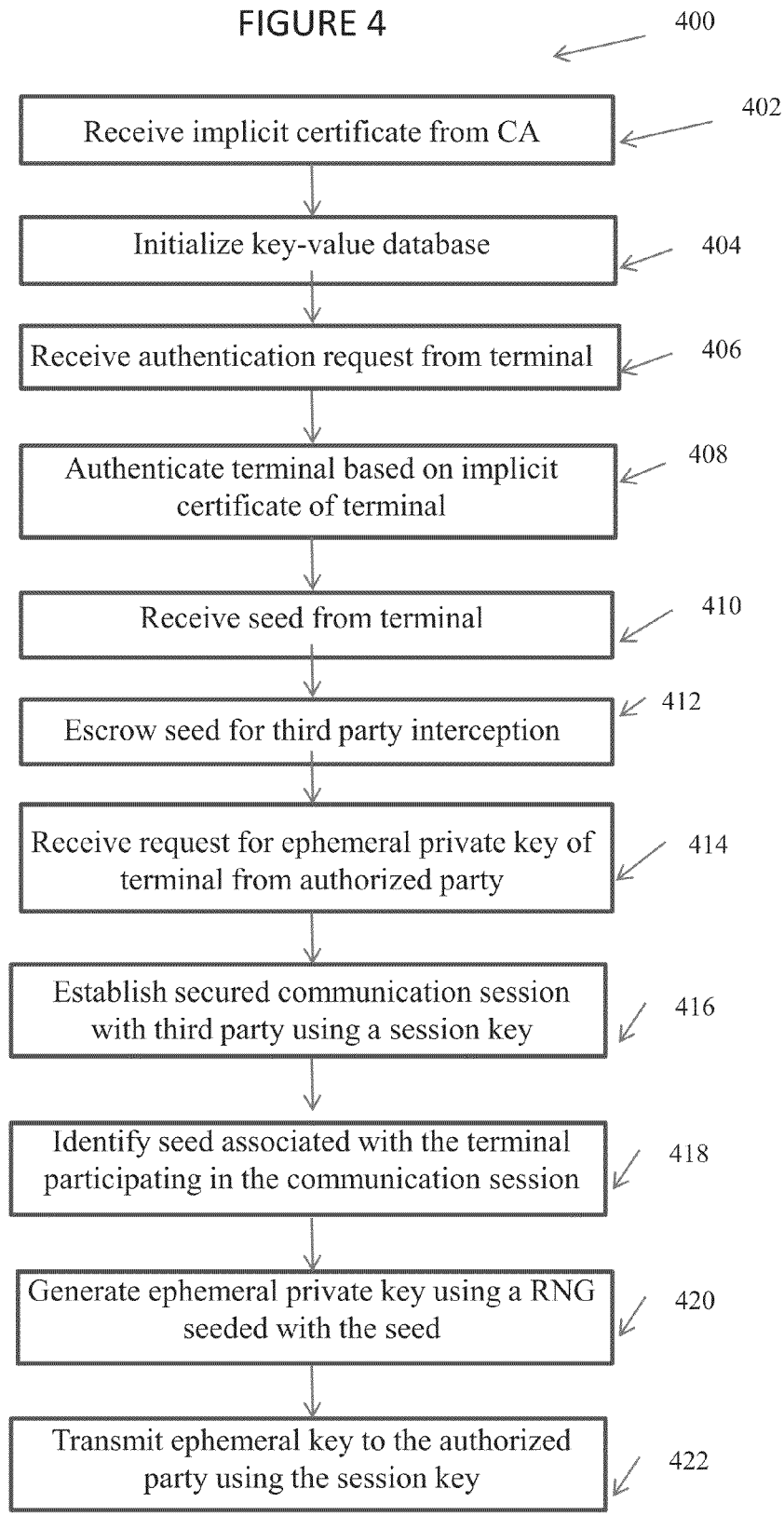

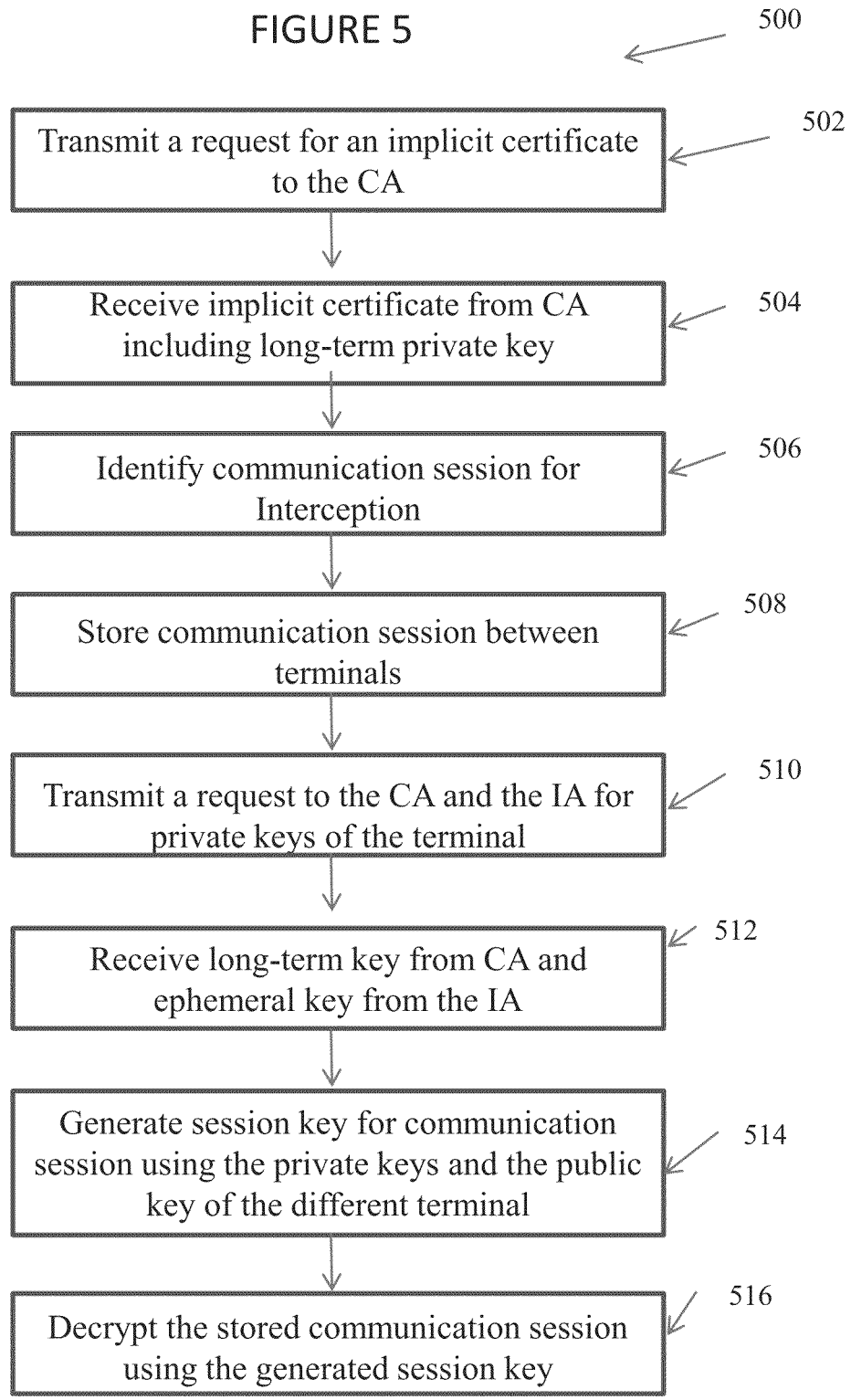

INTERCEPTING KEY SESSIONS

CLAIM OF PRIORITY

This application claims priority under 35 U.S.C. §119(e) to U.S. Provisional Patent Application Ser. No. 61/607,681, filed on Mar. 7, 2012, the entire contents of which are hereby incorporated by reference.

BACKGROUND

In public-key cryptography, key agreement allows two parties to securely establish a shared secret key. Importantly, the parties are not required to have any shared information in advance of the key agreement protocol. Typically both parties have a certificate, issued by a mutually trusted party called a CA (a certificate authority). The certificate binds the identity of each party to their public key, to assure the other party that the correct public key is being used in the key agreement protocol. Traditionally, a public-key certificate for the party U consists of the CA's signature on U's public key, their identity, and some additional information. In an implicit certificate scheme, the certificate consists of a value, denoted $P_U$, that is jointly computed by the CA and U, along with some additional information, denoted $I_U$. The certificate is denoted $cert_U=(P_U, I_U)$. The public key, denoted $Q_U$, can be derived by anyone from $cert_U$ and the CA's public key, and public parameters. The security of the scheme ensures that only U will know the secret key associated with the public key derived from $cert_U$. Examples of traditional (explicit) certificates are X.509 certificates signed with, for example, Elliptic Curve Digital Signature Algorithm (ECDSA). An example of implicit certificate scheme is Elliptic Curve Qu-Vanstone (ECQV).

BRIEF SUMMARY OF THE INVENTION

In some implementations, a method for providing a session key to a third party includes obtaining a private key associated with a public key certificate, and the session key for a communication session is based, at least in part, on the private key, an associated seed for a random number generator, and public keys assigned to a device participating in the communication session. The private key associated with the public key certificate is transmit, to an interception authority, and the interception authority is configured to grant the third party access to the private key and the associated seed to in response to a request from a third party authorized to access the communication session.

DESCRIPTION OF DRAWINGS

FIGS. 2-5 are flow charts illustrating example methods for enabling interception of communication sessions in accordance with some implementations of the present disclosure.

Like reference symbols in the various drawings indicate like elements.

DETAILED DESCRIPTION

Figure 1:
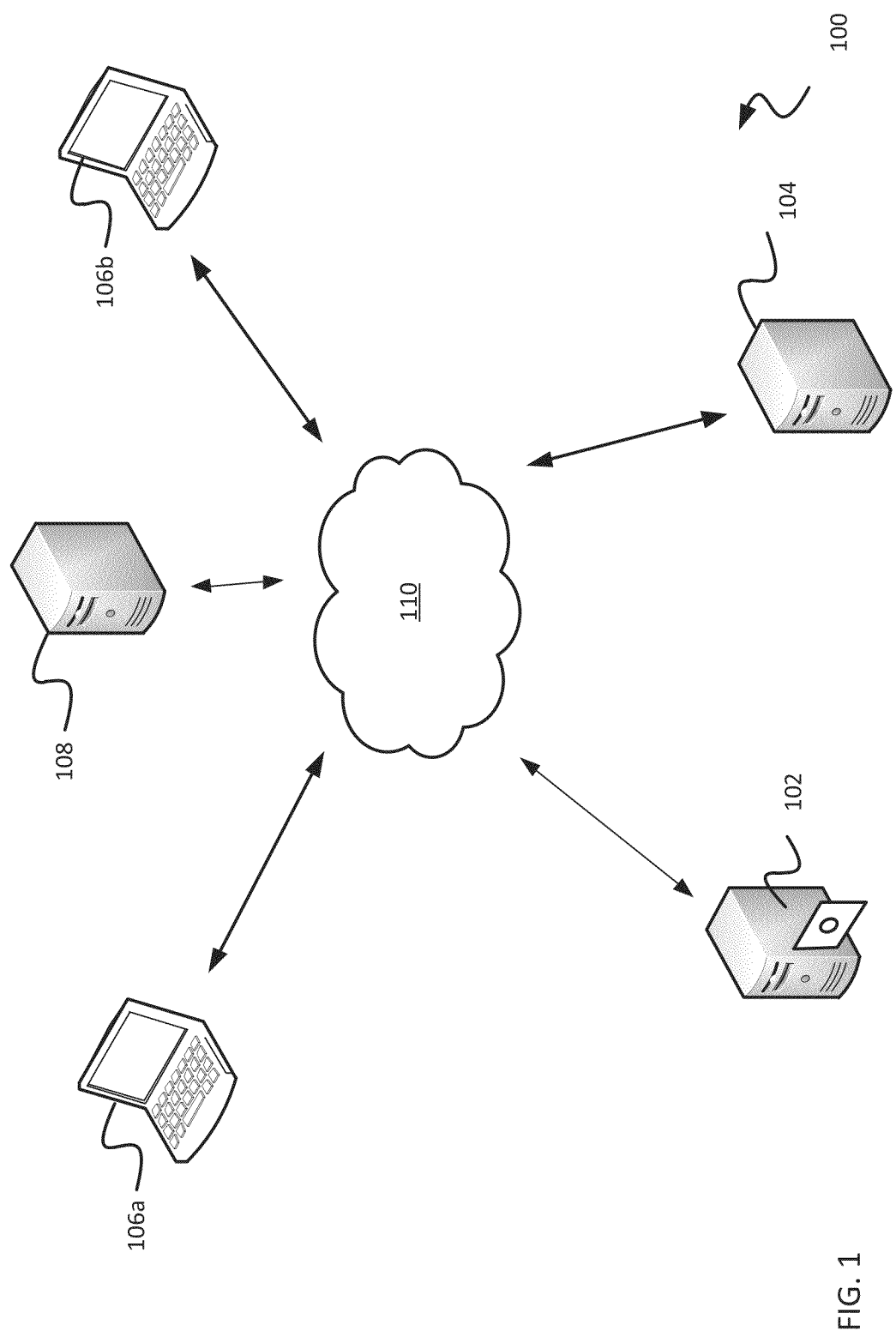
FIG. 1 is an example communication system that enables interception of communication sessions by third parties.

The present disclosure is directed to a system and method for enabling lawful interception of communication sessions by escrowing information used to construct associated session keys. The escrowed information may include one or more private keys, one or more seeds for a pseudorandom generator (RNG), and/or other private information used to generate a session key. In general, lawful interception (e.g., allowing police to recover the session key) is a requirement for many telecommunications standards, such as 3rd Generation Partnership Project (3GPP). In some implementations, a key agreement protocol may involve an escrow system or trusted entities that support lawful interception by authorized parties. For example, the escrowed information may be distributed amongst two or more trusted entities, and, in order to decrypt communication sessions, the authorized party may generate the associated session key by combining the information stored at each of the trusted entities. By dividing the information among different entities, the potential for abuse may be eliminated, minimized or otherwise reduced. In order to receive the information, law enforcement may submit a request to each of the entities identifying the communication session and their basis for authorization.

As previously mentioned, lawful interception may allow a third party L to learn, construct or otherwise generate the session key shared between two parties U and V. L is typically a law-enforcement agency, who may intercept a session with appropriate authorization, such as a warrant. The phrase "intercept a session" may include L learning the session key for the session and/or decrypting the traffic. In some implementations, strong cryptography may be executed, but the disclosed key agreement protocol enables L a mechanism to compute the session key. Conventional systems typically use weak cryptography, which also allows interception by individuals without proper authorization. Interception in this disclosure may be undetectable by U and V, not impact performance, and may not depend on their participation. For these reasons, the disclosed systems may not escrow session keys for each communication session.

For example, L may not directly have access to session keys. Instead, U and V may escrow some private or secret information with one or more interception authorities (IAs). The IAs may be denoted as $A_1, \ldots, A_\alpha$, and for simplicity the current example has $\alpha=2$. For each session intercept, L may contact $A_1$ and $A_2$, requesting access to session s. A session may be identified by a public identifier, denoted s. To give L access to s, IAs $A_1$ and $A_2$ may each respond with some secret information. L may then generate the session key for s using this information and decrypt the traffic. In some instances, L may only use secret information from one of U or V to intercept a session between them. In some implementations, none of the IAs can escrow sufficient information to learn any of the session keys individually. One or more of the participating IAs may be one or more Certificate Authorities (CAs). In some implementations, U and V may not perform additional security at the application layer such as by sending encrypted email or using an encrypted instant messaging service. In some implementations, the secret information provided to L may only allow a single session to be intercepted, so future and past communications of U and V may remain private, as do communications between U, V and other parties in other sessions. Limiting interception to a single session may be referred to as fine-grained access control. If both IAs participate, two independent checks of authorization may be provided. In addition, security may be maintained in the event of compromise of one of the IAs.

In some implementations, the key agreement protocol may be implemented based on ECQV. In these instances, an ECQV-escrow system may include a set of modifications to the conventional ECQV protocols. ECQV-escrow may proceed in a substantially identical manner to ECQV except certificate requests from users may be replaced by (0,O) (the trivial key pair, where the secret part of the request is the integer zero, and the public part is the zero (i.e., the identity element) of the elliptic curve group, which may also be referred to as the point at infinity), and the CA's response may be kept private. With ECQV-escrow, the CA may know the secret key corresponding to some, substantially all, or all issued certificates. In this implementation, ECQV-escrow certificates may be used. In addition, the issuing CA may be one of the IAs (e.g., $A_1$), and the certificate cert$_U$ for the user U may be created by the CA. U's device may also contain a deterministic random number generator (RNG) that is seeded with the seed value seed$_U$. The second IA, $A_2$ may escrow seed$_U$.

During key agreement, the ECMQV protocol may be used. An ECMQV session may be established with two public keys (per participant), typically called the long-term and ephemeral public key. The long-term public key may be the ECQV-escrow key (known to CA, who may act as $A_1$). The ephemeral key $R_U$ may be generated with an RNG seeded by seed$_U$. Since $A_2$ knows seed$_U$, $A_2$ may compute the ephemeral secret key as well. The session identifier may be s=(cert$_U$, $R_U$, cert$_V$, $R_V$), which is typically communicated publicly by U and V during the ECMQV protocol.

Also, the protocol may have an increased number of IAs, (for example, by deriving the ephemeral secret from multiple RNG seeds and escrowing each with a different IA), or use only a single CA/IA, by having a single party implement both escrow functions. A non-interceptable session may be provided easily if desired, by choosing the ephemeral secret from another, non-escrowed seed (other steps may be unchanged). The session key may be provided in nearly real-time. Once s is known, the IAs may send L information used to reconstruct the session key. L may also be given the ability to intercept the next k sessions of party U, by receiving the information from CA, then receiving the next k ephemeral keys U will use from $A_2$.

Turning to an example system for executing one or more implementations of the present disclosure, FIG. 1 is a schematic diagram of an example data communication system 100 showing an example context where secured traffic can be intercepted by third parties. The illustrated system 100 is for example purposes only and other systems may be used to enable a third party to intercept communications without departing from the scope of the disclosure. For example, other systems may include two or more interception authorities (IAs) independent of certificate authority (CA). As illustrated, system 100 includes a CA server 102, an IA server 104, two terminals 106a and 106b, and a third party device 108 coupled through a data network 110. The data communication system 100 can include additional, fewer, or different components. For example, the data communication system 100 may include additional storage devices, additional servers (including additional CA servers and/or IA servers), additional terminals, and other features not shown in the figure.

At a high level, the CA server 102 is an electronic device that issues public key certificates (e.g., implicit certificate), escrows one or more private keys for other devices such as the terminals 106, and discloses the private keys to the third party device 108 when authorized. The IA server 102 is an electronic device that escrows secret information (e.g., private keys, seeds for random number generators) for other devices such as the terminals 106. The terminals 106 are electronic devices that are owned, operated or otherwise associated with a user and operable to at least establish communication sessions. The third party device 108 is an electronic device that are owned, operated or otherwise associated with an enterprise (e.g., law enforcement or government agency, medical agency) and may transmit, to the CA server 102 and the IA sever 104, requests for secret information of the terminal 106a or 106b based on an authorization (e.g., warrant). After receiving the secret information, the third party 108 may generate the session key and decrypt a communication session between terminals 106a and 106b. Turning to a high level description of operation, the CA server 102 may issue public key certificates to the IA server 104, the terminals 106, and the third-party server 108. Using the issued certificates, the terminals 106a and 106b may establish a secured communication. In connection with the communication session, the terminal 106a may transmit at least one of a private key to the CA server 102 or secret information to the IA server 104 such as, for example, a seed for a random number generator. The third-party device 108 may transmit a request for secret information to the CA server 102 and the IA server 104 that also includes information identifying an authorization. In response to at least the request, the CA server 102 and the IA server 104 may transmit the requested secret information to the third-party device 108. The third-party device 108 may generate the session key for the communication session between the terminals 106a and 106b using the received secret information and decrypt the communication session.

Turning to a more detailed description of the aspects of the system 100, the CA server 102 can include any software, hardware, and/or software configured to issue certificates and escrow private keys of different user devices such as terminals 106. For example, the CA server 102 may issue explicit or implicit certificates to the IA server 104, the terminals 106, and/or the third-party device 108. In some implementations, the CA server 102 may execute one or more of the following: receive requests for public key certificates via the network 110; generate public key certificates (e.g., explicit certificates, implicit certificates) in response to at least the requests; transmit the generated certificates to the requesting devices; establish secure communication sessions with devices in the network 110; escrow private keys or secret information for devices that were issued public key certificates; receive requests for private keys from third party devices 108; verify authorizations of the third-party devices 108; establish secured communication session with the third-party device 108; transmit a private key associated with the communication session identified in the request; and/or other operations. In some implementations, the requesting device may be a server (e.g., IA server), a terminal, a third-party device, or other computing device. In regards to secure communication sessions, different entities may establish secure communications using any of a number of processes. In some examples, seed escrow may always include a secure channel between the UE and the IA. In some examples, the certificate request from the UE to the CA may not include a secure channel but the response from the CA may include a secure channel as it may have the long-term private key (in the ECQV-escrow primitive). In summary, communication sessions may not always include secure channels, or secure channels may not be limited to specific mechanisms for establishing one (e.g., issued certificates) without departing from the scope of this disclosure. In short, the CA server 102 is a computing system that can perform operations of a certificate authority in a cryptography system. The CA server 102 is generally operable to receive, transmit, process, and store information associated with the cryptography system. Although FIG. 1 shows a single CA server 102, a certificate authority can be implemented using multiple certificate authority servers 104, including server clusters, as well as additional or different types of computing devices other than servers.

The CA server 102 generally includes a data processing apparatus, a data storage medium, and a data communication interface. For example, the CA server 102 may include a processor, a memory, an input/output controller, and/or other features. A memory can include, for example, a random access memory (RAM), a storage device (e.g., a writable read-only memory (ROM), etc.), a hard disk, a buffer memory, or another type of storage medium. The memory can store instructions (e.g., computer code) associated with computer applications, programs and computer program modules, and other resources. The processor can include any type of data processing apparatus, for example, a general purpose micro-processor, a specialized processor, a digital controller, or another type of device. An input/output controller can be coupled to input/output devices (e.g., a monitor, a keyboard, etc.) and to the data network 110. The input/output devices can receive and transmit data in analog or digital form over communication links such as a serial link, wireless link (e.g., infrared, radio frequency, etc.), parallel link, or another type of link.

The IA server 104 can include any hardware, software, and/or firmware that escrows secret information of the terminals 106 and provide the third-party device 108 with the secret information. For example, the IA server 104 may store a seed for a random number generator for the terminal 106 and transmit a private key based on the seed to the third-party device 108. In some implementations, the IA server 104 may execute one or more of the following: transmit a request for a public key certificate to the CA server 102; establish secure communication sessions with the terminal 106*a* or 106*b*; receive secret information (e.g., seed) from the terminal 106*a* or 106*b*; store the secret information received from the terminal 106; receive a request for the secret information from the third party device 108; generate a private key for the terminal 106 in response to at least the request; establish a secure communication session with the third party device 108; transmit to the third party device 108 the generated private key using a session key; and/or other operations. In regards to certification, the IA server 104 and the CA server 102 may cross certify each other. In some implementations, the IA server 104 may not directly transmit a generated private key to the third party device 108 but may compute a value based, at least in part, on the secret information. In these instances, the third party device 108 does not receive private keys from the CA sever 102 or the IA server 104, and, instead, the session key may be generated using the values.

The IA server 104 generally includes a data processing apparatus, a data storage medium, and a data communication interface. For example, the IA server 104 may include a processor, a memory, an input/output controller, and/or other features. A memory can include, for example, RAM, a storage device (e.g., a writable ROM), a hard disk, a buffer memory, or another type of storage medium. The memory can store instructions (e.g., computer code) associated with computer applications, programs and computer program modules, and other resources. The processor can include any type of data processing apparatus, for example, a general purpose micro-processor, a specialized processor, a digital controller, or another type of device. An input/output controller can be coupled to input/output devices (e.g., a monitor, a keyboard, etc.) and to the data network 110. The input/output devices can receive and transmit data in analog or digital form over communication links such as a serial link, wireless link (e.g., infrared, radio frequency, etc.), parallel link, or another type of link.

The terminals 106*a* and 106*b* may be any local or remote computing device operable to receive requests from the user via a user interface, such as a Graphical User Interface (GUI), a CLI (Command Line Interface), or any of numerous other user interfaces. Thus, where reference is made to a particular interface, it should be understood that any other user interface may be substituted in its place. In various implementations, each terminal 106 comprises an electronic computing device operable to receive, transmit, process and store any appropriate data associated with system 100. There may be any number of terminals 106 communicably coupled to the CA server 102. Further, "terminals 106" and "user" may be used interchangeably as appropriate without departing from the scope of this disclosure. As used in this disclosure, terminal 106 is intended to encompass a personal computer, touch screen terminal, workstation, network computer, kiosk, wireless data port, wireless or wireline phone, personal data assistant (PDA), smartphone, tablet computer, at least one processor within these or other devices, or any other suitable processing device. For example, terminal 106 may comprise a computer that includes an input device, such as a keypad, touch screen, mouse, or other device that can accept information, and an output device that conveys information associated with the operation of the CA server 102 or terminals 106, including digital data, visual information, or GUI. Both the input device and output device may include fixed or removable storage media such as a magnetic computer disk, CD-ROM, or other suitable media to both receive input from and provide output to users of terminals 106 through the display, such as a GUI.

The third party device 108 can include any software, hardware and/or firmware configured to intercept a communication session between terminals 106*a* and 106*b*. As previously mentioned, the third-party device 108 may be owned, managed or otherwise associated with one or more third parties. The third party may include any suitable government and/or other agency that may monitor communications to provide one or more services. For example, the third party may be a government agency that is assigned to enforce laws, regulations, and/or orders passed by legislative process. For example, the third party may be a law enforcement agency that investigates suspected criminal activity. In some implementations, the third party device 108 may execute one or more of the following: request a public key certificate from the CA server 102; record a communication session between the terminals 106*a* and 106*b*; establish secure communication sessions with the CA server 102 and the IA server 104; transmit a request for secured information to the CA server 102 and the IA server 104; receive secret information from the CA server 102 and the IA server 104; generate a session key based, at least in part, on the received secret information; decrypt the recorded communication session using the computed session key; and/or others.

The third party device 108 generally includes a data processing apparatus, a data storage medium, and a data communication interface. For example, the third party device 108 may include a processor, a memory, an input/output controller, and/or other features. A memory can include, for example, RAM, a storage device (e.g., a writable ROM), a hard disk, a buffer memory, or another type of storage medium. The memory can store instructions (e.g., computer code) associated with computer applications, programs and computer program modules, and other resources. The processor can include any type of data processing apparatus, for example, a general purpose micro-processor, a specialized processor, a digital controller, or another type of device. An input/output controller can be coupled to input/output devices (e.g., a monitor, a keyboard, etc.) and to the data network 110. The input/output devices can receive and transmit data in analog or digital form over communication links such as a serial link, wireless link (e.g., infrared, radio frequency, etc.), parallel link, or another type of link.

Network 110 facilitates wireless or wireline communication between computer CA server 102, IA server 104, and any other local or remote computer, such as terminals 106. Indeed, while illustrated as single network 110, network 110 may be multiple networks without departing from the scope of this disclosure, so long as at least portion of network 110 may facilitate communications secret information. In other words, network 110 encompasses any internal and/or external network, networks, sub-network, or combination thereof operable to facilitate communications between various computing components in the system 100. Network 110 may communicate, for example, Internet Protocol (IP) packets, Frame Relay frames, Asynchronous Transfer Mode (ATM) cells, voice, video, data, and other suitable information between network addresses. Network 110 may include at least one local area network (LAN), radio access network (RAN), metropolitan area network (MAN), wide area networks (WAN), all or a portion of the global computer network known as the Internet, and/or any other communication system or systems at least one location.

In one aspect of operation, the CA server 102 may set up a key agreement scheme including defining, for example, key pairs, RNG, elliptic curve domain parameters, a hash function, and/or others. In response to requests for public key certificates, the CA server 102 may generate public key certificates associated with one or more private keys, and transmit the public key certificates to the IA server 104, the terminals 106, and the third-party device 108. In addition, the CA server 102 may escrow the private keys associated with the public key certificates of the terminals. In connection with receiving the certificate, the terminal 106a may generate a seed for a random number generator and generate a second private key by seeding the RNG with the seed. To establish a communication session with the terminal 106b, the terminal 106a may generate a session key based, at least in part, on the two private keys and the public keys of the terminal 106b. In some implementations, the session key may be based on three or more private keys without departing from the scope of the disclosure. The third party device 108 may record or otherwise store the communication session between the terminals 106. In order to decrypt the communication session, the third-party device 108 may transmit, to the CA server 102 and the IA server 104, a request for the private keys of the terminal 106a that identifies the communication session and the basis for authorization. In connection with verification of the authorization, the CA 102 may establish a secured communication session with the third-party device 108 using the public key certificate of the device 108 and transmit the private key to the third party device 108 using a session key. In addition, the IA 104 may generate a different private key by seeding an RNG using a seed, establish a secure communication with the third party device 108, and transmit the different private key to the third-party device 108 using a session key. After receiving the different private keys, the third-party device 108 may generate a session key for the communication session between the terminals 106 using the private keys of the terminal 106a and the public keys of the terminal 106b. The third-party device 108 decrypts the communication session using the generated session key.

FIGS. 2-5 are flowcharts illustrating example methods 200, 300, 400, and 500 for intercepting communication sessions based on an ECQV protocol. In particular, methods 200-500 describe operations of individual elements participating in interception of a communication sessions as followed: method 200 describes a user device; method 300 describes a certificate authority; method 400 describes an interception authority; and method 500 describes an authorized third party. These methods are for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

When describing the methods 200-500, an example interception process may identify parties as followed: CA for the certificate authority and for the first interception authority ($A_1$); $A_2$ for the second interception authority; U and V for the parties with certificates who will securely communicate; and L for an authority (such as law enforcement) intercepting a communication session. Referring to FIG. 2, method 200 begins a step 202 where a request is transmitted to the CA for an implicit certificate, and, at step 204, an implicit certificate is received. In the example, U may contact the CA who responds on a secure channel with $cert_U=P_U|I_U$ and the secret key $sk_U$, using the ECQV-escrow primitive described above. At step 206, a seed for a RNG is generated. U may generate a seed $seed_U$ at random for the RNG and $Q_U$ may denote the public key derived from $cert_U$. Next, at step 208, the ephemeral key is generated by seeding the RNG with the seed $seed_U$. In the example, U may generate an ephemeral key pair ($r_0$, $R_0$), where $r_0$ is the first value generated by the RNG seeded with $seed_U$ and $R_0=r_0G$ where G is a point that generates the elliptic curve group. An authentication request is transmitted to the IA at step 210, and the IA is authenticated based on an implicit certificate of the IA at step 212. As for the example, U contacts $A_2$ and performs an ECMQV key establishment, mutually authenticated by $cert_U$ and $cert_{A2}$. U's ephemeral key is $R_0$. A first session key is generated using the private keys and the public keys of the IA at step 214, and the seed is transmitted to the IA using the session key at step 216. Returning to the example, once the session is established, U may securely transmit $seed_U$ to $A_2$. In connection with a communication session, public keys of a different terminal are identified at step 218, and, at step 220, a second session key is generated for the communication session with the other terminal. As for the example, U may generate the ephemeral keypair ($r_U$, $R_U$), and V generates the ephemeral keypair ($r_V$, $R_V$). U and V use the ECMQV primitive with the public key pairs ($R_U$, $Q_U$) and ($R_V$, $Q_V$), corresponding secret keys ($r_U$, $sk_U$) and ($r_V$, sky). The shared key is $k_{UV}$ and the session ID is s=($cert_U$, $R_U$, $cert_V$, $R_V$). Additional information (such as a timestamp) may be included in s, provided U and V exchange this information during key agreement.

Referring to FIG. 3, method 300 begins at step 302 where an ECQV scheme is generated including identifying an RNG. As for the example, the CA may set up the ECQV scheme (which includes generating a key pair, and choosing elliptic curve domain parameters, and a hash function) and may perform the following additional steps. The CA may also select an RNG that U and V use for key agreement. Next, at step 304, an implicit certificate is issued to an interception authority identifying it as an interception authority. Returning to the example, $A_2$ is issued an implicit certificate that indicates its status as interception authority (this certificate may be issued by the CA or another party). At step 306, a request for an implicit certificate is received from a terminal, and an implicit certificate is generated at step 308 using the ECQV-escrow primitive described above. The long-term private key associated with the implicit certificate is escrowed at step 310, and the implicit key and the long-term private key are transmitted to the terminal at step 312. In the example, CA, on a secure channel, transmits, to U, $cert_U=P_U|I_U$ and the private key $sk_U$.

A request for the long-term private key of a terminal is received from an authorized party at step 314. Again in the example, CA receives, from L, (s, U) and information identifying authorization for L. In some implementations, L may only send s because s includes certU which, in turn, includes U's identity. A secured communication session is established with the third party using a session key at step 318, and the long-term private key of the terminal is transmitted to the third party at step 320. In the example, if L is authorized for s, CA responds with $sk_U$.

Referring to FIG. 4, method 400 begins at step 402 where an implicit certificate is received from the certificate authority. In the example, $A_2$ is issued an implicit certificate that indicates its status as interception authority (this certificate may be issued by the CA or another party). At step 404, a lookup-table database is initialized. As for the example, $A_2$ initializes a lookup-table database D (we write D[key] =value). An authentication request is received from a terminal at step 406, and the terminal is authenticated at step 408 using the implicit certificate of the terminal. Again in the example, U contacts $A_2$ and performs an ECMQV key establishment, mutually authenticated by $cert_U$ and $cert_{A2}$. Next, at step 410, the seed is received from the terminal, and, at step 412, the seed is escrowed. Returning to the example, U's ephemeral key is $R_0$, and, once the session is established, $A_2$ securely receives $seed_U$. $A_2$ then checks whether $R_0$ is correctly formed from $seed_U$, and aborts if not. In some implementations, $A_2$ may notify CA that U has completed the escrow step and the CA may revoke $cert_U$ if U does perform the escrow step with $A_2$ within a certain amount of time. In some implementations, the seed escrow step may be done before the device is deployed to U (for example, by the manufacturer). In these instances, the procedure above may not be executed or may be used for special circumstances where U's device generates $seed_U$, for example, to replace an exposed seed or to periodically refresh the seed. $A_2$ sets $D[cert_U]=seed_U$, and responds success to U. A request for the ephemeral private key of the terminal is received at step 414. As for the example, $A_2$ receives, from L, (s, U) and information identifying authorization. In some implementations, L may only send s because s includes $cert_U$ which, in turn, includes U's identity. At step 416, a secure communication session is established with third party using a session key, and, at step 418, the seed associated with the terminal is identified. The ephemeral key is generated by seeding the RNG with the identified seed at step 420, and the ephemeral key is securely transmitted to the third party using a session key at step 422. In the example, $A_2$ retrieves $seed_U=D[cert_U]$, then computes $r_U$ such that $r_U=\log(R_U)$, (where the logarithm is to base G) and sends $r_U$ to L. $A_2$ may recover $r_U$ by computing $r_0, r_1, \ldots$ and checking whether $r_iG=R_U$.

Referring to FIG. 5, method 500 begins at step 502 where a request for an implicit certificate is transmitted to the CA. At step 504, an implicit certificate including a long-term private key is received. A communication session for interception is identified at step 506, and the communication session is stored at step 508. Returning to the example, L may record the session between U and V. At step 510, a request for the long-term private key is transmitted to the CA, and a request for the ephemeral private key is transmitted to the IA. In the example, to intercept s for user U and recover $k_{UV}$, L sends (s, U) (and its authorization) to CA and $A_2$. In some implementations, L may only send s because s includes $cert_U$ which, in turn, includes U's identity. At step 512, the long-term private key and the ephemeral private key are received from the CA and IA, respectively. As for the example, if L is authorized for s, CA responds with $sk_U$ and $A_2$ responds with $r_U$. Next, at step 514, the session key for the communication session is generated using the received private keys and the public keys of the different terminal. In the example, L has $(sk_U, r_U)$, $(R_U, Q_U)$, $(R_V, Q_V)$, which is used to recover $k_{UV}$ by performing U's actions in the ECMQV primitive. The communication session is decrypted using the recovered session key at step 516. The described interception protocol is for illustration purposes and other implementations may be executed for the interception protocol without departing form the scope of the disclosure. In some implementations, L may censor $R_V$ and $cert_V$ from the request, in order to protect V's identity from CA and $A_2$. In some implementations, L may submit $cert_U$ and a number of sessions k starting at counter C. The CA's response may be the same, but $A_2$ may respond with $r_j$ for j=C, C+1, . . . , C+k. These implementations may be useful if L intends to intercept U's communication over an extended period of time, since it may not include interaction with CA and $A_2$ for each interception. In some implementations, $A_2$ may have an estimate of the number (or the exact number) of sessions that U has initiated, allowing him to compute $r_U$ more efficiently. For example, if the estimated number (or exact number) is greater the number n, then $r_{n+1}$ may be computed, skipping computations for $r_0, \ldots, r_n$, to determine whether $r_UG=R$.

In addition to the variations in the protocol discussed above, the key agreement may include alternative or additional variations. In some implementations, the key agreement may include an alternative randomness generation. In this variant, the random values may be computed as $r_i \leftarrow Fseed_U(time_U)$, where F is a pseudorandom function keyed by the value $seed_U$ (an example choice of F is HMAC), and $time_U$ is a timestamp chosen by U. Both U and V may include the timestamps in their ECMQV messages, and these values may be included in the SharedInfo parameter of the protocol In some implementations, the SharedInfo parameter may require that the user device (i) have a reliable clock (or access to a network time service, like on the cellular network), and (ii) implement the seed update step.

In some key agreement operations, entities U and V may establish keying data using the elliptic curve MQV scheme. For clarity, only U's use of the operation may described. Entity V's use of the operation may be analogous, but with the roles of U and V reversed. Entity U may establish keying data with V using the keys and parameters established during the setup procedure and the key deployment procedure as follows:

Input: The input to the key agreement operation may be:
1. An integer keydatalen which is the number of octets of keying data required.
2. (Optional) An octet string SharedInfo which consists of some data shared by U and V. This octet string may be included and may contain information identifying the entities U and V.

Output: An octet string K which is the keying data of length keydatalen octets, or "invalid".

Actions: Establish keying data as follows:
1. Use an elliptic curve MQV primitive to derive a shared secret field element $z \in F_q$ from U's key pairs $(d_{1,U}, Q_{1,U})$ and $(d_{2,U}, Q_{2,U})$ established during the key deployment procedure and V's public keys $Q_{1,V}$ and $Q_{2,V}$ obtained during the key deployment procedure. If the MQV primitive outputs "invalid", output "invalid" and stop.
2. Convert $z \in F_q$ to an octet string Z using a conversion routine.
3. Use the key derivation function KDF established during the setup procedure to generate keying data K of length keydatalen octets from Z and [SharedInfo]. If the key derivation function outputs "invalid", output "invalid" and stop.

4. Output K.

When L makes a request to $A_2$ to intercept (s, U), it may also provide time$_U$, so that $A_2$ may quickly compute $r_U$ as Fseed$_U$(time$_U$).

In another variation, an alternative interception may be executed. In this variant, L may not be given sk$_U$ by CA, but L may still compute $k_{UV}$. The variant does include CA learning $R_V$ and may not enable L to request intercept information for k future sessions in advance (as described in the second option to the intercept protocol above). This may be possible based on the following observation. In ECMQV, the point P from which $k_{UV}$ is derived, can be written as $$P=P_1+P_2$$

where $$P_1=h(R_U*sk_U)(R_V+R_V Q_V), \text{ and}$$

$$P_2=hr_U(R_V+R_V*Q_V)$$

and h is the cofactor of the elliptic curve, and notation Z* denotes an integer derived from the point Z. For example, a suitable key derivation function is applied to Z and some additional information such as, for example, the identifiers of the participants, timestamps, and the messages exchanged during the key agreement protocol. Since $A_2$ knows $r_U$, it may compute $P_2$. Since CA knows sk$_U$, it may compute $P_1$. L sends (s, U) to CA and $A_2$ and receives $P_1$ and $P_2$. In some implementations, L may only send s because s includes cert$_U$ which, in turn, includes U's identity. L may then compute the ECMQV output point P and derive $k_{UV}$ from it. In these implementations, L may not learn sk$_U$.

In another variation, the interception may operate with SEC 4 (Standards for efficient cryptography, SEC 4: Elliptic Curve Cryptography) compliant CAs. While the techniques previously described may execute specialized behavior from the CA, this solution may operate with standard (i.e., SEC 4 compliant) ECQV CAs. In these implementations, the user may obtain an ECQV certificate from a SEC 4 compliant CA and then simply sends its private key to another interception authority, $A_3$ (encrypted under $A_3$'s public key). $A_3$ may be the same party as the CA or may be a separate entity.

The described implementations may be extended to cover situations where L intends to intercept a session for which s is unknown but U and V are identified as the parties communicating. Since CA knows cert$_U$ and cert$_V$, and thus $Q_U$ and $Q_V$, the challenge may be to determine $R_U$ and $R_V$ such that the resulting $k_{UV}$ is correct. Without additional information, given that U has participated in at most $I_U$ sessions and V has participated in at most $I_V$ sessions, $A_2$ may have to try $I_U I_V$ pairs ($r_U$, $r_V$) in order to find $k_{UV}$ used in s. If the service provider has an estimate of the number of sessions U and/or V have established, this information may be used to guide the search. Similarly, the number of potential $k_{UV}$ to try may be smaller if the time stamping variant is used, provided the timestamps have low resolution, and L can reasonably estimate when the session was initiated. Implementing this feature may require that the user device (i) have a reliable clock (or access to a network time service, like on the cellular network), and (ii) implement the seed update step.

Testing whether a potential key $k_{UV}$ is used in s is also an issue. Assuming that the plaintexts are drawn from a low-entropy distribution, decrypting a portion of the ciphertext and checking for redundancy may be possible, depending on the mode. It may also be possible to attempt to verify a MAC of the ciphertext (again, depending on the mode). Most authenticated encryption methods should enable confirmation whether a partial decryption is successful.

A low-tech solution to intercept an existing session is to have the service provider interrupt it (e.g., drop the connection), forcing the devices to re-establish a new session, so that L may observe the initial handshake. This may however, cause U and/or V to suspect that the resumed session is being intercepted.

As discussed above, it may be desirable for L to be able to intercept all or substantially all of U's sessions over specified period of time. For example, L may be given a warrant to intercept all of U's communications during one month. Interception windows may be implemented by rotating the seed used to generate the ephemeral key $r_U$. A master seed $s_0$ is used with an RNG to generate sub-seeds: $s_1$ during time period $t_1$, $s_2$ for time period $t_2$, and so on.

Revealing $s_i$ allows L to compute all of the ephemeral secrets used during time period i, but since the pseudorandom generator is backtracking resistant (a standard security property of RNGs), L cannot compute $s_0$ from $S_i$. Since the RNG is also unpredictable, computing $S_{i+1}$ from $s_i$ is also intractable.

Implementing this feature requires that the user device (i) have a reliable clock (or access to a network time service, like on the cellular network), and (ii) implement the seed update step.

In general, the disclosed implementations can escrow two or more keys (or information allowing the two or more keys to be recovered), then use a key agreement protocol to compute a session key that uses both the escrowed keys or the information allowing the two keys to be recovered. A number of generalizations are possible. In some instances, the information escrowed may be a combination of keys, or seeds from which keys may be generated. In some instances, an Menezes-Qu-Vanstone (MQV) agreement protocol may be replaced with the Diffie-Hellman key agreement protocol, in any of possible combination of key types: (static, static), (static, ephemeral), or (ephemeral, ephemeral). In some instances, more than two keys may be used (and also escrowed) if variants of the MQV and DH key agreement protocols are used. An example of such an MQV variant that uses three keys simple replaces one of the key pairs (x, xG) by the combination of two others, i.e., the key pair ($x_1+x_2$, $x_1G+x_2G$) formed from the two others ($x_1$, $x_1G$) and ($x_2$, $x_2G$). In some instances, the ECQV-escrow method of certifying users' keypairs may be replaced with a standard explicit certificate scheme, such as X.509 certificates created with the ECDSA signature scheme, where the CA chooses the key pair of the user.

A number of embodiments of the invention have been described. Nevertheless, it will be understood that various modifications may be made without departing from the spirit and scope of the invention. Accordingly, other embodiments are within the scope of the following claims.

In some implementations, a method for providing a session key to a third party includes generating a public key certificate corresponding to a private key. The private key associated with the implicit certificate is stored. A session key for a communication session between a first device and a second device is based, at least in part, on the private key, an associated seed for a random number generator, and public keys assigned to the second device.

Various implementations may include one or more of the following. A seed associated with the first device is obtained, and the seed associated with the first device is stored. The seed for the random number generator is received. The seed for the random number generator is received from at least one of the first device or a manufacturer of the first device. A request for the implicit certificate is received from the first device, and the public key certificate is generated based, at least in part, on the request. A request for information associated with the first device is received from a third party, and the session key between the first device and the second device is determined using the requested information. When the private key comprises a long-term private key, an ephemeral private key is generated based, at least in part, on the associated seed, and the long-term private key and the ephemeral private key is transmitted to the third party. Information identifying different seeds for different time periods is received, and the associated seed is determined based, at least in part, on the information identifying the different seeds for the different time periods. When the private key comprises a first private key, a random number generator dependent on time and a current time are identified, and a second private key is determined based, at least in part, on the a time-dependent random number generator, the current time, and the associated seed. When a second value is calculated by interception authority different from the certificate authority based, at least in part, on the associated seed, the session key determined based, at least in part, on the first value and the second value, a first value is calculated based, at least in part, on the private key, and the first value is transmitted to the third party. The public key certificate is based, at least in part, on an Elliptic Curve Qu-Vanstone (ECQV) certificate protocol.

In some implementations, a certification authority includes memory and one or more processors. The memory is configured to store private keys associated with public key certificates. The one or more processors is configured to generate a public key certificate corresponding to a private key and store the private key associated with the implicit certificate. A session key for a communication session between a first device and a second device is based, at least in part, on the private key, an associated seed for a random number generator, and public keys assigned to the second device.

Various implementations may include one or more of the following. The processors are further operable to obtain a seed associated with the first device and store the seed associated with the first device. The processors are further operable to receive the seed for the random number generator. The seed for the random number generator is received from at least one of the first device or a manufacturer of the first device. The processors are further operable to receive a request for the public key certificate from the first device and generate the public key certificate based, at least in part, on the request. The processors are further operable to receive, from a third party, a request for information associated with the first device, and the session key between the first device and the second device is determined using the requested information. When the private key comprises a long-term private key, the processors are further operable to generate an ephemeral private key based, at least in part, on the associated seed and transmit the long-term private key and the ephemeral private key to the third party. The processors are further operable to receive information identifying different seeds for different time periods and determine the associated seed based, at least in part, on the information identifying the different seeds for the different time periods. When the private key comprises a first private key, the processors are further operable to identify a random number generator dependent on time, identify a current time, and determine a second private key based, at least in part, on the a time-dependent random number generator, the current time, and the associated seed. When a second value is calculated by an interception authority different from the certificate authority based, at least in part, on the associated seed, the key session determined based, at least in part, on the first value and the second value, the processors are further operable to calculate a first value based, at least in part, on the private key, and transmit the first value to the third party. The public key certificate is based, at least in part, on an Elliptic Curve Qu-Vanstone (ECQV) certificate protocol.

In some implementations, a method for providing a session key to a third party includes receiving information identifying a seed for a random number generator associated with a first device. The seed associated with the first device is stored. A session key for a communication session between the first device and a second device is based, at least in part, on a private key associated with a public key certificate, the seed for the random number generator, and public keys assigned to the second device.

Various implementations may include one or more of the following. The seed for the random number generator is received from at least one of the first device or a manufacturer of the first device. A request for information associated with the first user equipment is received from a third party, and the session key between the first device and the second device is determined using the requested information. When the private key comprises a long-term private key, an ephemeral private key is generated based, at least in part, on the associated seed, and the ephemeral private key is transmitted to the third party. Information identifying different seeds for different time periods is received, and the associated seed is determined based, at least in part, on the information identifying the different seeds for the different time periods. When the private key comprises a first private key, a random number generator dependent on time and a current time is identified, and a second private key is determined based, at least in part, on the time-dependent random number generator, the current time, and the associated seed. A first value is calculated based, at least in part, on the private key, a second value is calculated based, at least in part, on the associated seed, the session key is calculated based, at least in part, on the first value and the second value, and the session key is transmitted to the third party.

In some implementations, an interception authority includes memory and one or more processors. The memory is configured to store private keys associated with public key certificates. The one or more processors are configured to receive information identifying a seed for a random number generator associated with a first device and store the seed associated with the first device. A session key for a communication session between the first device and a second device is based, at least in part, on a private key associated with a public key certificate, the seed for the random number generator, and public keys assigned to the second device.

Various implementations may include one or more of the following. The seed for the random number generator is received from at least one of the first device or a manufacturer of the first device. The processors are further operable to receive, from a third party, a request for information associated with the first device, and the session key between the first device and the second device is determined using the requested information. When the private key comprises a long-term private key, the processors are further operable to generate an ephemeral private key based, at least in part, on the associated seed and transmit the ephemeral private key to the third party. The processors are further operable to receive information identifying different seeds for different time periods and determine the associated seed based, at least in part, on the information identifying the different seeds for the different time periods. When the private key comprises a first private key, the processors are further operable to identify a random number generator dependent on time, identify a current time, and determine a second private key based, at least in part, on the a time-dependent random number generator, the current time, and the associated seed. The processors are further operable to calculate a first value based, at least in part, on the private key, calculate a second value based, at least in part, on the associated seed, calculate the key session based, at least in part, on the first value and the second value, and transmit the key session to the third party.

What is claimed is:

1. A method for providing a session key to a third party, comprising:
   obtaining a private key associated with a public key certificate for a first device,
   generating the session key for a communication session between the first device and a second device based, at least in part, on the private key, an associated seed for a random number generator, and public keys assigned to the first device participating in the communication session; and
   in connection with establishing the communication session, transmitting, to a first interception authority, by the first device, the private key for the first device,
   wherein the second device transmits the associated seed for the random number generated to a second interception authority for storing separate from the private key,
   wherein the first interception authority is different from the second interception authority, and,
   in response to response to an authorized request to access the communication session between the first device and the second device, the first interception authority is configured to grant the third party access to the private key and the second interception authority is configured to grant the third party access to the associated seed.

2. The method of claim 1, wherein the public key certificate is an implicit certificate.

3. The method of claim 1, wherein the session key is determined based on two or more private keys including the private key.

4. The method of claim 1, wherein the first interception authority comprises a certification authority that issued the public key certificate.

5. The method of claim 1, wherein the public key certificate comprises a first certificate, the communication session comprises a subsequent communication session, the method further comprising establishing an initial communication session with the first interception authority using a session key generated using a second public key certificate assigned to the first interception authority and the private key, wherein the private key is transmitted to the first interception authority using the session key.

6. The method of claim 1, wherein the public key certificate is based, at least in part, on an Elliptic Curve Qu-Vanstone (ECQV) protocol and the session key is based on an Menezes-Qu-Vanstone (MQV) protocol.

7. The method of claim 1, wherein the private key is obtained in response to at least one of activating of second device or receiving a request for a communication session from the second device.

8. User equipment for providing a session key to a third party, comprising:
   memory configured to store a private key associated with a public key certificate; and
   one or more processors configured to:
   obtaining the private key associated with a public key certificate for a first device,
   generating the session key for a communication session between the first device and a second device based, at least in part, on the private key, an associated seed for a random number generator, and public keys assigned to the first device participating in the communication session; and
   in connection with establishing the communication session, transmitting, to a first interception authority, by the first device, the private key for the first device,
   wherein the second device transmits the associated seed for the random number generated to a second interception authority for storing separate from the private key,
   wherein the first interception authority is different from the second interception authority, and,
   in response to response to an authorized request to access the communication session between the first device and the second device, the first interception authority is configured to grant the third party access to the private key and the second interception authority is configured to grant the third party access to the associated seed.

9. The user equipment of claim 8, wherein the public key certificate is an implicit certificate.

10. The user equipment of claim 8, wherein the session key is determined based on two or more private keys including the private key.

11. The user equipment of claim 8, wherein the first interception authority comprises a certification authority that issued the public key certificate.

12. The user equipment of claim 8, wherein the public key certificate comprises a first certificate, the communication session comprises a subsequent communication session, the processors further operable to establish an initial communication session with the first interception authority using a session key generated using a second public key certificate assigned to the first interception authority and the private key, wherein the private key is transmitted to the first interception authority using the session key.

13. The user equipment of claim 8, wherein the key certificate is based, at least in part, on an Elliptic Curve Qu-Vanstone (ECQV) protocol and the session key is based on an Menezes-Qu-Vanstone (MQV) protocol.

14. The user equipment of claim 8, wherein the private key is obtained in response to at least one of activating of second device or receiving a request for a communication session from the second device.

* * * * *